US 8,249,168 B2

(12) United States Patent  
Graves

(10) Patent No.: US 8,249,168 B2  
(45) Date of Patent: Aug. 21, 2012

(54) MULTI-INSTANCE VIDEO ENCODER

(75) Inventor: Hans W. Graves, Nashua, NH (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 934 days.

(21) Appl. No.: 12/266,155

(22) Filed: Nov. 6, 2008

(65) Prior Publication Data

US 2010/0111192 A1    May 6, 2010

(51) Int. Cl.  
*H04N 7/12*  (2006.01)

(52) U.S. Cl. ............ 375/240.25; 375/240.02; 375/240.1; 375/240.01

(58) Field of Classification Search .................. None  
See application file for complete search history.

(56) References Cited

U.S. PATENT DOCUMENTS

| 8,054,880 B2* | 11/2011 | Yu et al. .................. 375/240.03 |
| 2003/0023982 A1* | 1/2003 | Lee et al. ...................... 725/116 |
| 2005/0262510 A1* | 11/2005 | Parameswaran et al. ..... 718/105 |
| 2007/0086528 A1* | 4/2007 | Mauchly et al. ......... 375/240.24 |
| 2008/0137736 A1* | 6/2008 | Richardson et al. ..... 375/240.03 |
| 2009/0125538 A1* | 5/2009 | Rosenzweig et al. ......... 707/101 |

* cited by examiner

*Primary Examiner* — David Y Jung  
(74) *Attorney, Agent, or Firm* — Hamilton & Terrile, LLP; Gary W. Hamilton

(57) ABSTRACT

A system and method are disclosed for providing improved processing of video data. A multi-instance encoding module receives combined video and audio input, which is then separated into a video and audio source streams. The video source stream is pre-processed and corresponding video encoder instances are initiated. The preprocessed video source stream is split into video data components, which are assigned to a corresponding encoder instance. Encoding operations are performed by each video encoder instance to generate video output components. The video output components are then assembled in a predetermined sequence to generate an encoded video output stream. Concurrently, the audio source stream is encoded with an audio encoder to generate an encoded audio output stream. The encoded video and audio output streams are combined to generate a combined encoded output stream, which is provided as combined video and audio output.

20 Claims, 3 Drawing Sheets

MULTI-INSTANCE VIDEO ENCODER

BACKGROUND OF THE INVENTION

1. Field of the Invention

Embodiments of the invention relate generally to information processing systems. More specifically, embodiments of the invention provide a system and method for providing improved processing of video data.

2. Description of the Related Art

The resolution of graphical and video formats has continued to improve in recent years. As an example, the current high definition video standard supports resolution rates of 1920×1080 pixels resulting in over two million pixels of video data per video frame. The need to process these large volumes of video data, which includes encoding operations such as compression, transcoding, and scaling, has resulted in the development of more powerful processors.

However, it is not uncommon for the full power of these processors to be underutilized. In some cases, a stream of video data is processed by a single processor of a multi-processor central processing unit, even though the remaining processors are idle. In other cases, the video data stream fails to be off-loaded to an available display controller that may include one or more specialized graphic processors. In an effort to address these issues, a number of current video encoder products (e.g., DIVX, Microsoft's Windows Media Video, etc.) provide a means to distribute the processing of video data across multiple processors. However, since many such providers fail to publish supporting documentation, it is often difficult to fully utilize the capabilities they provide.

Another issue is scalability. Some known approaches are optimized for real-time streaming, meaning you cannot "look ahead in time." As a result, scaling linearly using multiple processors becomes challenging. Other approaches include segmenting a video stream, processing each segment as a single thread, and then merging the processed segments into a resulting output stream. Each of these approaches has attendant advantages and disadvantages. In view of the foregoing, there is a need to more fully utilize the resources provided by multiple processors to improve the processing of video data.

SUMMARY OF THE INVENTION

A system and method are disclosed for providing improved processing of video data. In various embodiments, a multi-instance encoding module receives combined video and audio input, which is then separated into a video source stream and an audio source stream. In these and other embodiments, video encoder instances are initiated and associated with a corresponding processor operable to perform encoding operations. In one embodiment, the processor is a central processor of a central processing unit. In another embodiment, the processor is a graphics processor of a display controller.

Once the video encoder instances are initiated, the preprocessed video source stream is split into video data components such as a frame or group of frames. The individual video data components are then assigned to a corresponding encoder instance. In one embodiment, the assignment of the individual video data components is load balanced equally across multiple processors. In another embodiment, the assignment of the individual video data components is load balanced dynamically across multiple processors.

Encoding operations are then performed by each video encoder instance to generate video output components. In various embodiments, the encoding operations may comprise the transcoding, compression, decompression, or scaling of video data components to generate the video output components. The video output components are then assembled in a predetermined sequence to generate an encoded video output stream. In one embodiment, the audio source stream is encoded with an audio encoder to generate an encoded audio output stream. The encoded video output stream and the encoded audio output stream are combined to generate a combined encoded output stream, which is then provided as combined video and audio output.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
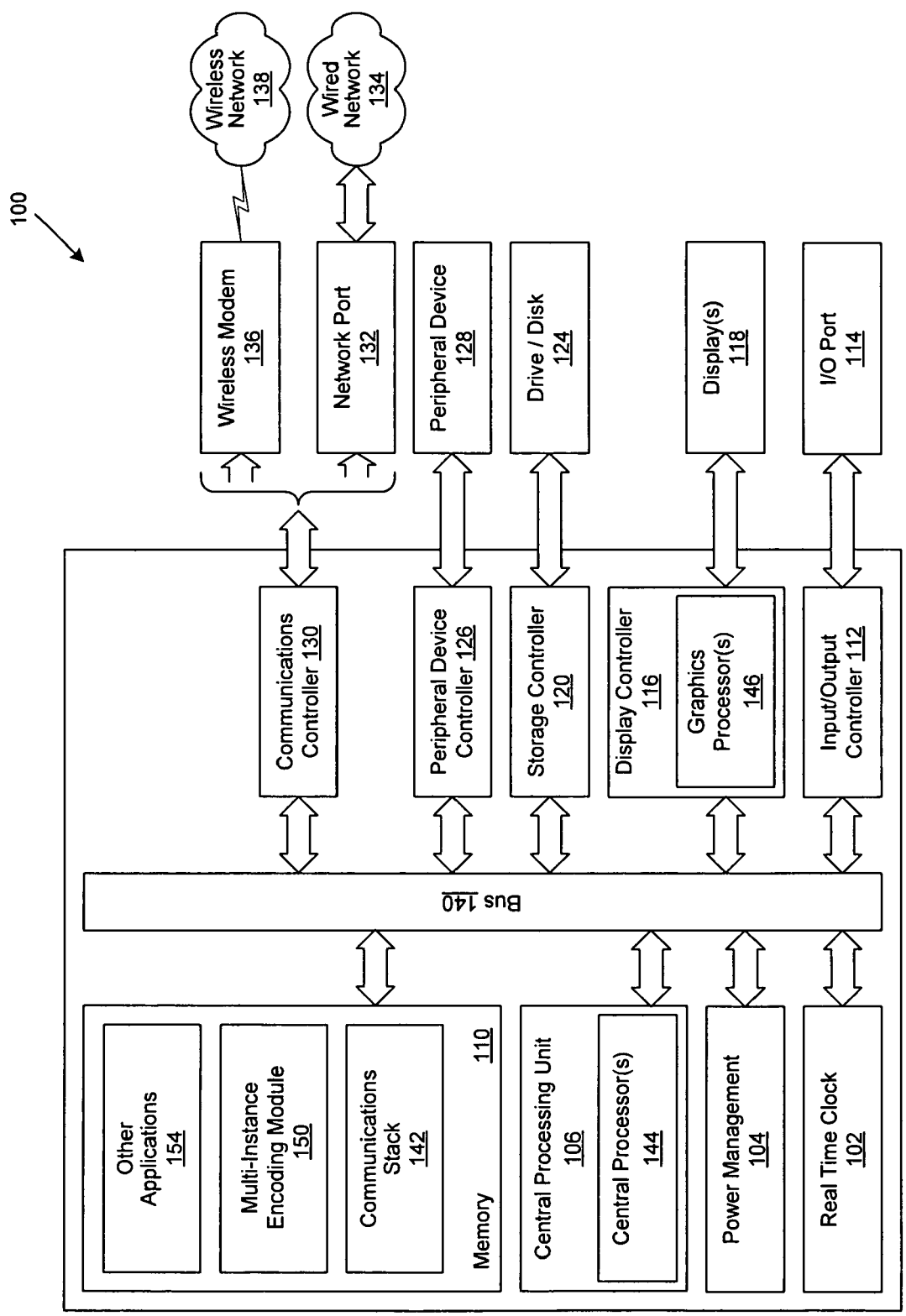
FIG. 1 is a generalized block diagram illustrating an information processing system as implemented in accordance with an embodiment of the invention.

A system and method are disclosed for providing improved processing of video data. FIG. 1 is a generalized block diagram illustrating an information processing system 100 as implemented in accordance with an embodiment of the invention. System 100 comprises a real-time clock 102, a power management module 104, a central processing unit 106 and memory 110, all physically coupled via bus 140. In various embodiments, the central processing unit 106 comprises at least one central processor 144 and the memory 110 comprises volatile random access memory (RAM), non-volatile read-only memory (ROM), non-volatile flash memory, or any combination thereof. In one embodiment, memory 110 also comprises communications stack 142, a multi-instance encoding module 150, and other applications 154.

Also physically coupled to bus 140 is an input/out (I/O) controller 112, further coupled to a plurality of I/O ports 114. In different embodiments, I/O port 114 may comprise a keyboard port, a mouse port, a parallel communications port, an RS-232 serial communications port, a gaming port, a universal serial bus (USB) port, an IEEE1394 (Firewire) port, or any combination thereof. Display controller 116 is likewise physically coupled to bus 140 and further coupled to display 118. In various embodiments, display controller 116 comprises at least one graphic processor 146. In one embodiment, display 118 is separately coupled, such as a stand-alone, flat panel video monitor. In another embodiment, display 118 is directly coupled, such as a laptop computer screen, a tablet PC screen, or the screen of a personal digital assistant (PDA). Likewise physically coupled to bus 140 is storage controller 120 which is further coupled to mass storage devices such as a tape drive or hard disk 124. Peripheral device controller is also physically coupled to bus 140 and further coupled to peripheral device 128, such as a random array of independent disk (RAID) array or a storage area network (SAN).

In one embodiment, communications controller 130 is physically coupled to bus 140 and is further coupled to network port 132, which in turn couples the information processing system 100 to one or more physical networks 134, such as a local area network (LAN) based on the Ethernet standard. In other embodiments, network port 132 may comprise a digital subscriber line (DSL) modem, cable modem, or other broadband communications system operable to connect the information processing system 100 to network 134. In these embodiments, network 134 may comprise the public switched telephone network (PSTN), the public Internet, a corporate intranet, a virtual private network (VPN), or any combination of telecommunication technologies and protocols operable to establish a network connection for the exchange of information.

In another embodiment, communications controller 130 is likewise physically coupled to bus 140 and is further coupled to wireless modem 136, which in turn couples the information processing system 100 to one or more wireless networks 138. In one embodiment, wireless network 138 comprises a personal area network (PAN), based on technologies such as Bluetooth or Ultra Wideband (UWB). In another embodiment, wireless network 138 comprises a wireless local area network (WLAN), based on variations of the IEEE 802.11 specification, often referred to as WiFi. In yet another embodiment, wireless network 138 comprises a wireless wide area network (WWAN) based on an industry standard including two and a half generation (2.5G) wireless technologies such as global system for mobile communications (GPRS) and enhanced data rates for GSM evolution (EDGE). In other embodiments, wireless network 138 comprises WWANs based on existing third generation (3G) wireless technologies including universal mobile telecommunications system (UMTS) and wideband code division multiple access (W-CDMA). Other embodiments also comprise the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

Figure 2:
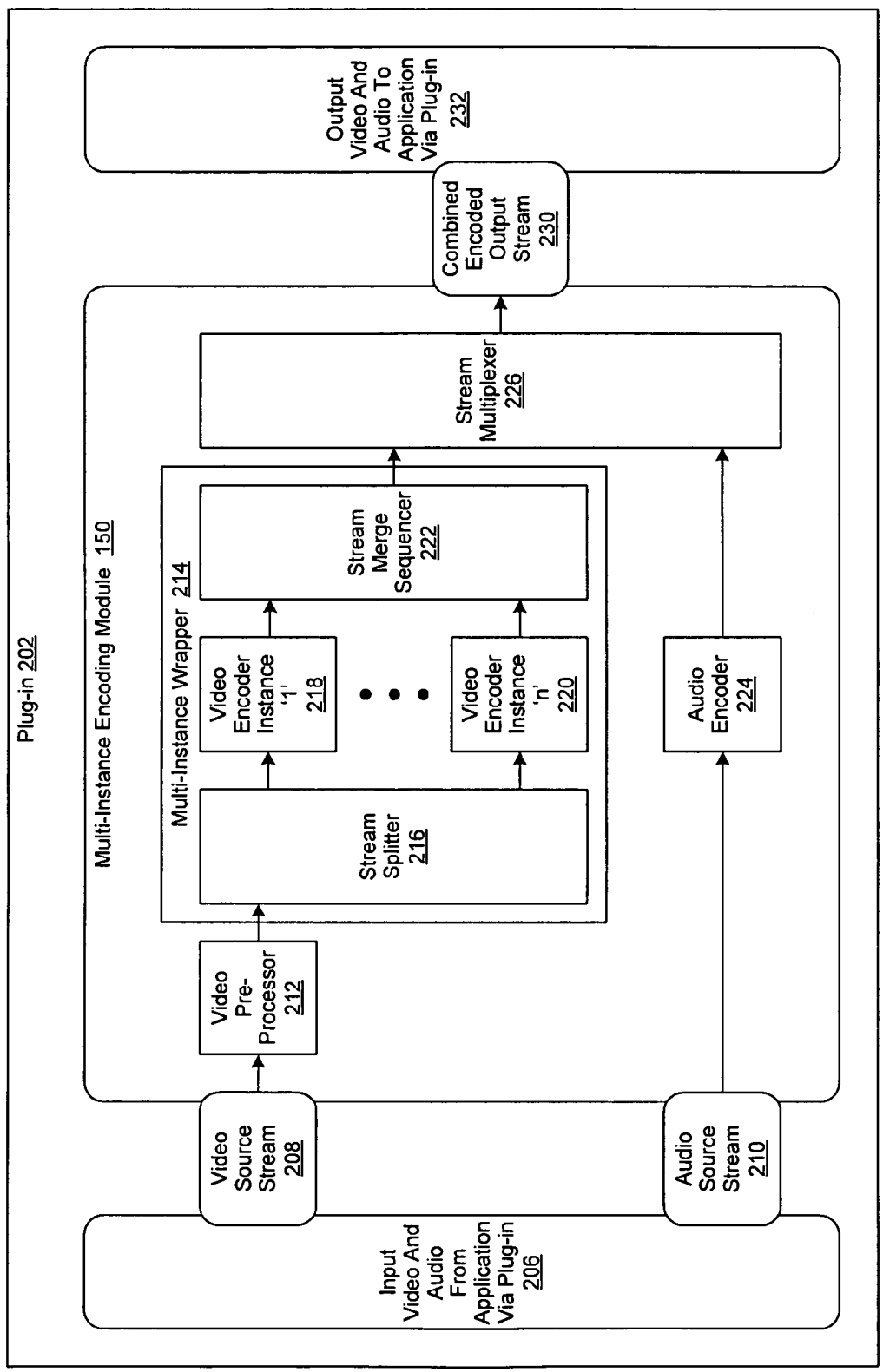
FIG. 2 is a simplified block diagram of a multi-instance encoding module as implemented in accordance with an embodiment of the invention.

FIG. 2 is a simplified block diagram of a multi-instance encoding module 150 as implemented in accordance with an embodiment of the invention to improve the processing of video data. In this embodiment, resources available for the performance of multi-instance video encoding operations are determined, followed by the receipt of combined video and audio input 206 from an application plug-in 202. As used herein, an application plug-in refers to computer executable code that interacts with a host application to provide a function, such as the encoding of video data, on demand.

The combined video and audio input 206 is separated into a video source stream 208 and an audio source stream 210. In one embodiment, the video source stream 208 is then preprocessed with a video preprocessor 212 familiar to those of skill in the art and provided to a multi-instance wrapper 214. In various embodiments, the multi-instance wrapper comprises a stream splitter 216, a plurality of video encoder instances '1' 218 through 'n' 220, and a stream merge sequencer 222. The video encoder instances '1' 218 through 'n' 220 are initiated corresponding to the preprocessed video source stream and resources available for encoding video data. In one embodiment, the individual video encoder instances '1' 218 through 'n' 220 are associated with a corresponding processor. In another embodiment, the processor is a central processor of a central processing unit. In yet another embodiment, the processor is a graphics processor of a display controller. In various embodiments, these processors are operable to perform encoding operations.

Once the video encoder instances '1' 218 through 'n' 220 are initiated, the preprocessed video source stream is split into video data components by the stream splitter 216. As used herein, a video data component refers to a unit of video data, such as a frame, group of frames, or fields. Skilled practitioners of the art will be knowledgeable of many such units of video data and references to the foregoing are not intended to limit the spirit, scope, or intent of the invention. The individual video data components are then assigned to a corresponding encoder instance '1' 218 through 'n' 220. In one embodiment, the assignment of the individual video data components is load balanced equally across multiple processors as described in greater detail herein. In another embodiment, the assignment of the individual video data components is load balanced dynamically across multiple processors as likewise described in greater detail herein.

Encoding operations are then performed by each video encoder instance '1' 218 through 'n' 220 to generate video output components. In various embodiments, the encoding operations may comprise the transcoding, compression, or scaling of video data components to generate the video output components. The video output components are then assembled in a predetermined sequence by the stream merge sequencer to generate an encoded video output stream. In one embodiment, the audio source stream 210 is encoded with an audio encoder 224 to generate an encoded audio output stream. In this embodiment, the encoded video source stream and the encoded audio source stream are multiplexed by the stream multiplexer 226 to generate a combined encoded output stream 230. The combined encoded output stream 230 is then provided to the application plug-in 202 as combined video and audio output 232.

Figure 3:
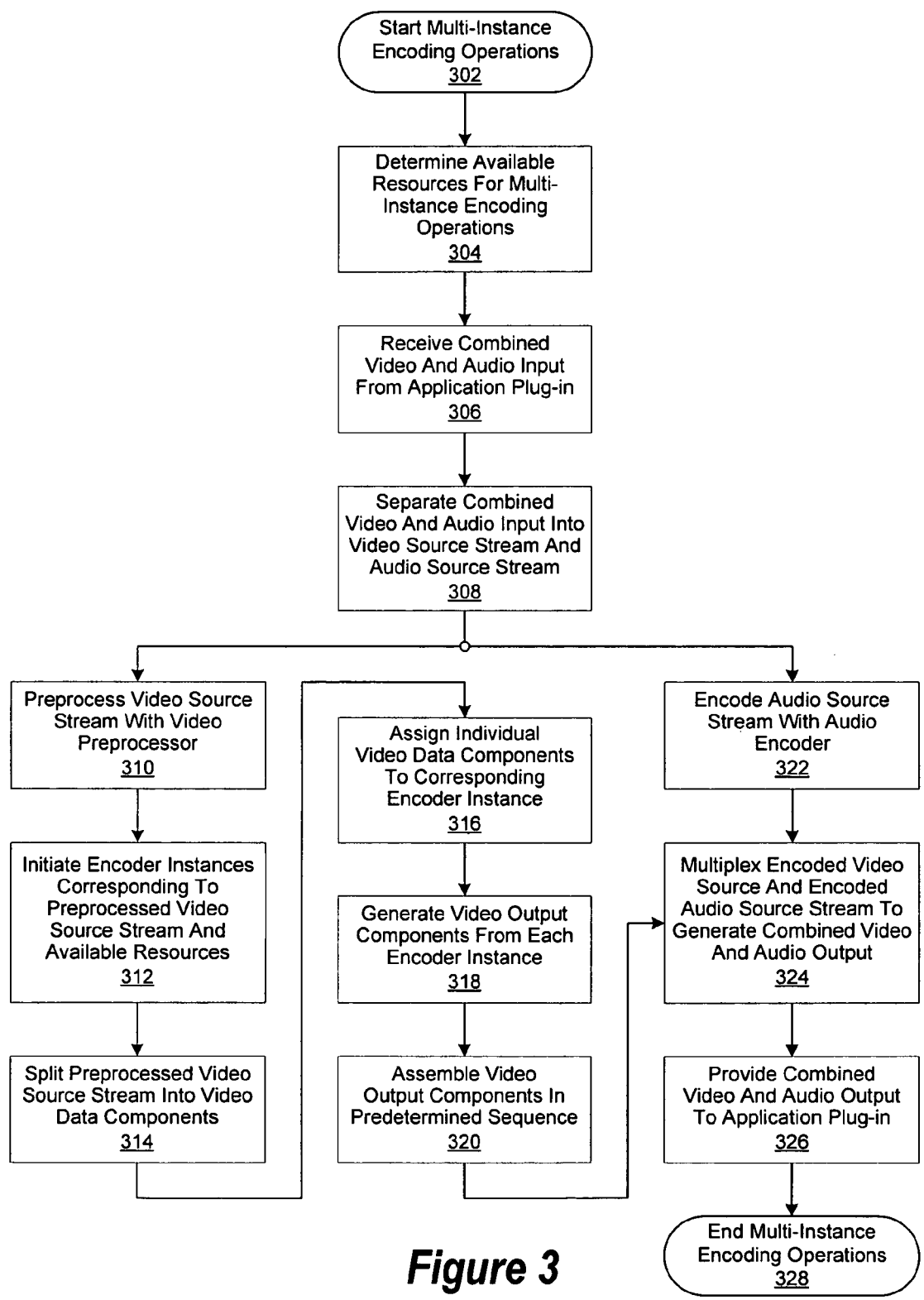
FIG. 3 is a generalized flowchart of the operation of a multi-instance encoding module as implemented in accordance with an embodiment of the invention.

FIG. 3 is a generalized flow chart of the operation of a multi-instance encoding module as implemented in accordance with an embodiment of the invention. In various embodiments, a multi-instance encoding module is implemented to improve the processing of video data. In this embodiment, multi-instance video encoding operations are begun in step 302, followed by the determination in step 304 of resources available for the performance of multi-instance video encoding operations. In one embodiment, combined video and audio input is received in step 306 from an application plug-in. In another embodiment, video input and audio input are received in step 306 as separate streams from an application plug-in. As used herein, an application plug-in refers to computer executable code that interacts with a host application to provide a function, such as the encoding of video data, on demand. Known application plug-ins typically rely upon services provided by the host application and generally are unable to operate independently. Conversely, the host application is able to operate independently of an application plug-in, allowing plug-ins to be dynamically added, updated, or removed without a corresponding modification to the host application. In addition, plug-ins generally rely upon the host application's user interface and have well defined boundaries to their allowed actions.

In one embodiment, the combined video and audio input is separated into a video source stream and an audio source stream in step 308. In another embodiment, the video input and audio input streams are already separate and are treated as a video source stream and an audio source stream in step 308. In one embodiment, the video source stream is then preprocessed in step 310 with a video preprocessor familiar to those of skill in the art. Instances of a video encoder instances are then initiated in step 312, corresponding to the preprocessed video source stream and resources available for encoding video data. In one embodiment, individual video encoder instances are associated with a corresponding processor. In another embodiment, the processor is a central processor of a central processing unit. In yet another embodiment, the processor is a graphics processor of a display controller. In various embodiments, these processors are operable to perform encoding operations.

Once the instances of the video encoder are initiated, the preprocessed video source stream is split into video data components in step 314. As used herein, a video data component refers to a unit of video data, such as a frame, group of frames, or fields. Skilled practitioners of the art will be knowledgeable of many such units of video data and references to the foregoing are not intended to limit the spirit, scope, or intent of the invention. The individual video data components are then assigned to a corresponding encoder instance in step 316. In one embodiment, the assignment of the individual video data components is load balanced equally across multiple processors. As an example, an information processing system may comprise a quad core processor, each of which is associated with a corresponding instance of a video encoder. Each video data component is sequentially assigned to the first, second, third and fourth video encoder instance, which are in turn respectively associated with a first, second, third and fourth processor. In another embodiment, the assignment of the individual video data components is load balanced dynamically across multiple processors. As an example, an information processing system may comprise a quad core processor, each of which is associated with a corresponding instance of a video encoder. Each video data component is dynamically assigned to the first, second, third and fourth video encoder instance as their respectively associated first, second, third and fourth processor become available.

Encoding operations are then performed in step 318 by each video encoder instance to generate video output components. In various embodiments, the encoding operations may comprise the transcoding, compression, decompression, or scaling of video data components to generate the video output components. The video output components are then assembled in a predetermined sequence in 320 to generate an encoded video output stream. In one embodiment, concurrent with the performance of steps 310 through 320, the audio source stream is encoded with an audio encoder in step 322 to generate an encoded audio output stream. In one embodiment, the encoded video source stream and the encoded audio source stream are multiplexed to generate combined video and audio output in step 324. The combined video and audio output is then provided to the application plug-in in step 326 and multi-instance encoding operations are then ended in step 328.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A system for providing improved processing of video data, comprising:
    a multi-instance encoder module operable to:
        receive a first stream of video data as video input;
        perform encoding operations on said first stream of video data to generate a plurality of video data components;
        assign individual video data components of said plurality of video data components to at least one of a plurality of processors operable to generate video output components from said individual video data components;
        assemble said video output components in a predetermined sequence to generate a second stream of video data; and
        provide said second stream of video data as video output.

2. The system of claim 1, wherein said encoding operations comprise the:
    transcoding of said first stream of video data;
    compression of said first stream of video data;
    decompression of said first stream of video data; or
    scaling of said first stream of video data.

3. The system of claim 1, wherein said multi-instance encoder module comprises a plurality of video encoder instances.

4. The system of claim 3, wherein individual said video encoder instances are associated with an individual said at least one of a plurality of processors.

5. The system of claim 1, wherein said at least one of a plurality of processors is operable to perform encoding operations.

6. The system of claim 1, wherein said at least one of a plurality of processors comprises a central processor.

7. The system of claim 1, wherein said at least one of a plurality of processors comprises a graphics processor.

8. The system of claim 1, wherein said generation of video output components is performed in parallel by said plurality of processors.

9. The system of claim 1, wherein said assignment of said individual video data components is load balanced equally across said plurality of processors.

10. The system of claim 1, wherein said assignment of said individual video data components is load balanced dynamically across said plurality of processors.

11. A method for providing improved processing of video data, comprising:
    using a multi-instance encoder module to:
        receive a first stream of video data as video input;
        perform encoding operations on said first stream of video data to generate a plurality of video data components;
        assign individual video data components of said plurality of video data components to at least one of a plurality of processors operable to generate video output components from said individual video data components;
        assemble said video output components in a predetermined sequence to generate a second stream of video data; and
        provide said second stream of video data as video output.

12. The method of claim 11, wherein said encoding operations comprise the:
    transcoding of said first stream of video data;
    compression of said first stream of video data;
    decompression of said first stream of video data; or
    scaling of said first stream of video data.

13. The method of claim 11, wherein said multi-instance encoder module comprises a plurality of video encoder instances.

14. The method of claim 13, wherein individual said video encoder instances are associated with an individual said at least one of a plurality of processors.

15. The method of claim 11, wherein said at least one of a plurality of processors is operable to perform encoding operations.

16. The method of claim 11, wherein said at least one of a plurality of processors comprises a central processor.

17. The method of claim 11, wherein said at least one of a plurality of processors comprises a graphics processor.

18. The method of claim 11, wherein said generation of video output components is performed in parallel by said plurality of processors.

19. The method of claim 11, wherein said assignment of said individual video data components is load balanced equally across said plurality of processors.

20. The method of claim 11, wherein said assignment of said individual video data components is load balanced dynamically across said plurality of processors.

* * * * *